United States Patent [19]

Abens et al.

[11] Patent Number: 4,585,708
[45] Date of Patent: Apr. 29, 1986

[54] FUEL CELL SYSTEM WITH PREMIXING OF WATER MISCIBLE HYDROCARBON FUEL AND WATER

[75] Inventors: Sandors G. Abens, Rye, N.Y.; William Keil, Redding; Mohammad Farooque, Huntington, both of Conn.

[73] Assignee: Energy Research Corporation, Danbury, Conn.

[21] Appl. No.: 743,433

[22] Filed: Jun. 11, 1985

[51] Int. Cl.$^4$ .............................................. H01M 8/04
[52] U.S. Cl. ...................................... 429/17; 429/19; 429/22; 429/34
[58] Field of Search ...................... 429/19, 17, 22, 24, 429/34, 25, 62, 64, 72

[56] References Cited
U.S. PATENT DOCUMENTS

| | | | |
|---|---|---|---|
| 3,539,395 | 11/1970 | Bartas | 429/17 |
| 3,607,419 | 9/1971 | Keating, Jr. | 429/17 |
| 3,615,850 | 10/1971 | Chludzinski et al. | 429/17 |
| 3,976,507 | 8/1976 | Bloomfield | 429/17 |
| 3,982,962 | 9/1976 | Bloomfield | 429/19 |
| 4,001,041 | 1/1977 | Menard | 429/17 |
| 4,120,787 | 10/1978 | Yargeau | 210/26 |
| 4,128,700 | 12/1978 | Sederquist | 429/17 |
| 4,200,682 | 4/1980 | Sederquist | 429/17 |

*Primary Examiner*—Anthony Skapars
*Attorney, Agent, or Firm*—John J. Torrente

[57] ABSTRACT

A fuel cell system employing a reformer for developing a fuel process gas from a hydrocarbon fuel-water mixture wherein the mixture is generated by exclusively delivering a water miscible hydrocarbon fuel to a mixing tank when the level of constituents in the mixing tank falls below a first predetermined level, ceasing delivery of the fuel and initiating exclusive delivery of water to the mixing tank when the level of constituents in the mixing tank rises to a second predetermined level, ceasing delivery of water when the constituents in the mixing tank rise to a third predetermined level, with the level in the mixing tank at the third predetermined level, delivering the hydrocarbon fuel-water mixture to a holding tank when the hydrocarbon fuel-water mixture in the holding tank falls below a first predetermined position, and ceasing delivery of the mixture to the holding tank when the level of constituents in the mixing tank falls below said first predetermined level.

13 Claims, 3 Drawing Figures

SWITCHES

| SWT. | STATUS FOR ACTION | FCTN. |
|---|---|---|
| F3 | CLOSE (dry) | DEFINES OPERATING STATUS OF VALVES V5, V6 AND PUMP FP2 |
| M1 | CLOSE (dry) | |
| M2 | CLOSE (full) | |
| M3 | CLOSE (full) | |

COMPONENT OPERATION

| COMP. | NORMAL POSITION | OPERATING POSITION | |
|---|---|---|---|
| | | POWER ON | POWER OFF |
| V5 | CLOSED | M3 and F3 closed | M1 closed |
| V6 | OPEN | M3 closed | M2 closed M3 open |
| 1P2 | OFF | M1 closed | M2 closed |
| V7 | CLOSED | | |

FIG. 3

FUEL CELL SYSTEM WITH PREMIXING OF WATER MISCIBLE HYDROCARBON FUEL AND WATER

BACKGROUND OF THE INVENTION

This invention relates to fuel cell systems and, in particular, to fuel cell systems wherein a reformer is used to generate fuel process gas for the fuel cell of the system.

In many systems of this type, the reformer used is a steam reformer in which water and a hydrocarbon fuel such as, for example, methanol or ethanol, are directly mixed in the reformer or in a common conduit leading to the reformer. Systems of this type are disclosed in U.S. Pat. Nos. 3,539,395; 3,607,419; 3,982,962; 3,976,507; 4,001,041; 4,120,787; 4,128,700 and 4,200,682. U.S. Pat. No. 3,615,850 also discloses a system of this type wherein the fuel and water are first mixed together in a heat exchanger and, thereafter, conveyed to the reformer.

While the systems of the above patents provide the needed fuel and water to the reformer, they fail to provide it in a manner which promotes optimum system operation and efficiency. In particular, due to the manner of combining the water and fuel, there is a likelihood of inaccuracies occuring in the amount of each constituent combined. This, in turn, can lead to an insufficient amount of fuel gas being generated. It can also lead to fuel being introduced with the fuel process gas into the fuel cell. Both these effects contribute to reduced fuel cell performance.

Furthermore, the manner of mixing the hydrocarbon fuel and water can cause less than total mixing as well as remnant water in the system when the system is shut down. Failure to properly mix the two constituents results in the effects mentioned above with an attendant reduction in performance. Remnant water in the system, on the other hand, can cuase freezing problems, particularly where the fuel cell system is to be used in colder climates.

It is, therefore, an object of the present invention to provide a fuel cell system and method wherein mixing of hydrocarbon fuel and water occurs on board a power plant, in a manner which does not give rise to the above disadvantages.

It is a further object of the present invention to provide a fuel cell system and method wherein hydrocarbon fuel and water are mixed in volumetrically accurate proportions and in a manner which promotes thorough mixing.

It is yet a further object of the present invention to provide a fuel cell system and method wherein hydrocarbon fuel and water are mixed such that the likelihood of the water freezing upon shutdown is greatly reduced.

SUMMARY OF THE INVENTION

In accordance with the principles of the present invention, the above and other objectives are realized in a fuel cell system wherein a water miscible hydrocarbon fuel and water are first introduced into a mixing tank in accurate volumetric proportions and, thereafter, the resultant fuel-water mixture is conveyed to the inlet mixing section of a holding tank.

A first conduit means couples the fuel-water mixture from the outlet section of the holding tank to the reformer of the fuel cell system. A second conduit means, in turn, couples a portion of the fuel-water mixture in the first conduit back to the inlet section of the holding tank so as to promote thorough mixing of the mixture.

Control means is further provided for cyclically controlling the flow of water and hydrocarbon fuel to the mixing tank and subsequent flow of the resultant fuel-water mixture to the holding tank. In particular, the water miscible hydrocarbon fuel is conveyed from a fuel supply only after the fuel-water mixture in the mixing tank is below a first predetermined level. Fuel only then enters the mixing tank until a predetermined volumetric amount is added as determined by the level of constituents in the tank reaching a second predetermined level. After the latter level is reached, the supplying of fuel ceases and the supplying of water begins until a predetermined volumetric amount of water is added as determined by the constituent level in the tank reaching a third predetermined level. At this time, the supplying of water ceases.

Once the fuel-water mixture in the mixing tank is at the third predetermined level, it can be conveyed to the holding tank. This occurs only when the level of the fuel-water mixture in the holding tank falls below a first predetermined point at which the holding tank can accommodate the entire fuel-water mixture in the mixing tank between the first and third predetermined levels. At this time, the fuel-water mixture is delivered to the holding tank. When the fuel-water mixture in the mixing tank falls below the first predetermined level, delivery to the holding tank ceases and the cycle of introducing fuel and water to the mixing tank and delivering the resultant fuel-water mixture to the holding tank is repeated.

In a further aspect of the invention, the supplying of water to the mixing tank is based upon gravity so that water can be purged from the system upon shut down.

BRIEF DESCRIPTION OF THE DRAWINGS

The above and other features and aspects of the present invention will become more apparent upon reading the following detailed description in conjunction with the accompanying drawings, in which:

FIG. 3 shows the switch and component operating conditions for the switches, valves and pump of the apparatus of FIG. 2.

DETAILED DESCRIPTION

Figure 1:
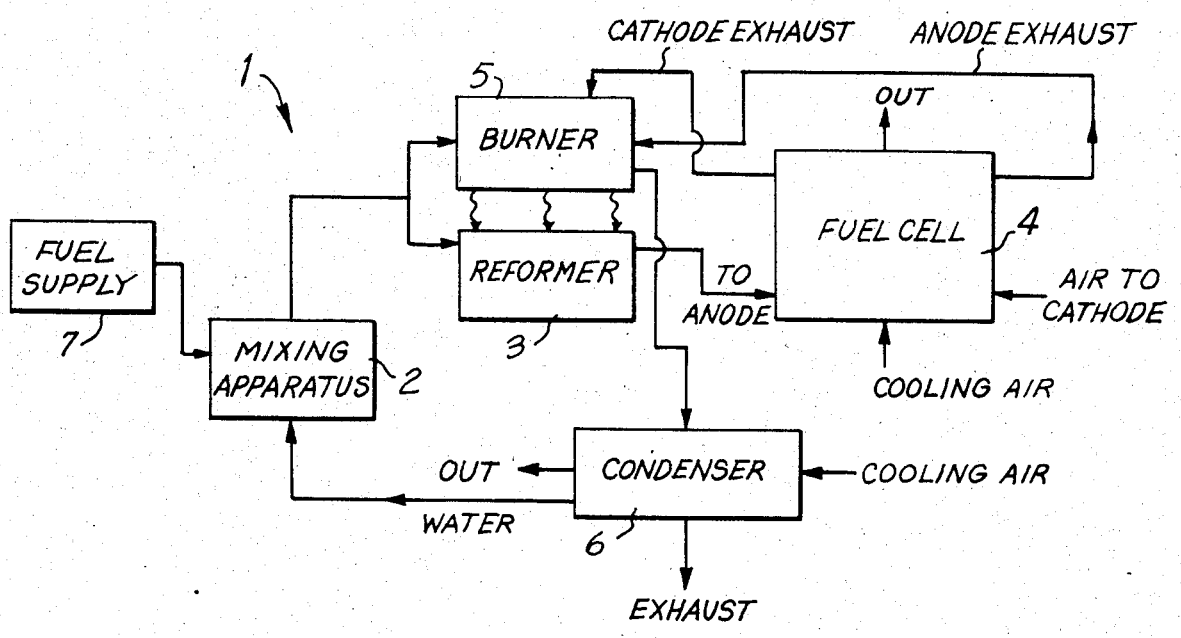
FIG. 1 shows a fuel cell system incorporating the apparatus and method of the invention.

FIG. 1 shows a fuel cell system 1 employing an apparatus 2 for providing a hydrocarbon fuel-water mixture for the steam reformer 3 of the system. The reformer 3, in turn, converts the fuel-water mixture to fuel process gas which is delivered to the anode of the fuel cell 4. The fuel cell 4 also receives oxidant process gas at its cathode for electrochemical conversion with the fuel process gas to produce electrical energy. A gas stream separate from the process gas streams, provides air to the cell for cooling same.

Gases exhausted from the cathode and anode of the cell 4 are conveyed to a burner 5 which burns these gases with (during start up) or without (during running) the mixture from the apparatus 2 to produce heat for the reformer 3. The burner exhaust is then passed through a condenser 6 which is also provided with cooling air stream. The condenser 6 removes a portion of the water content in the exhaust stream and this water is delivered to the mixing apparatus 2 for combining with water miscible hydrocarbon fuel from the water miscible hydrocarbon fuel supply 7.

Figure 2:
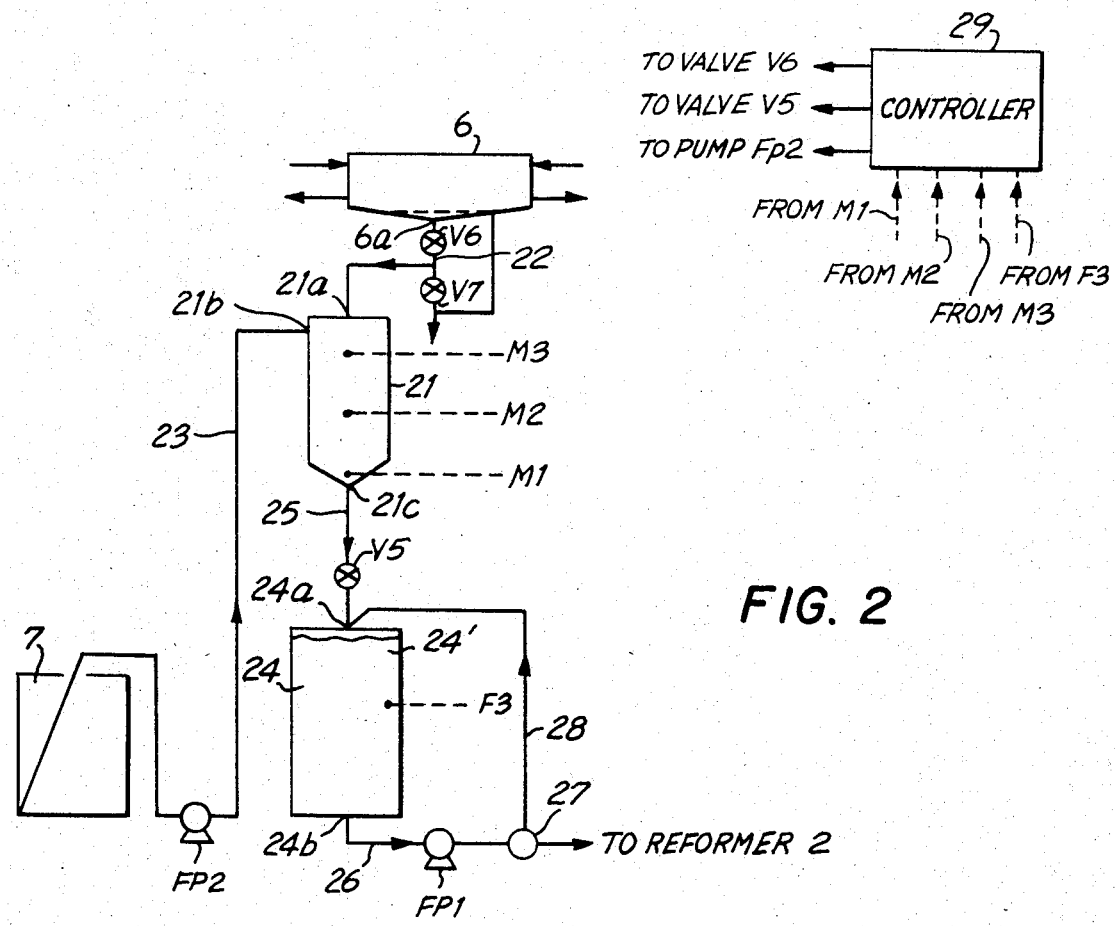
FIG. 2 shows the apparatus of the invention shown in FIG. 1 in greater detail.

FIG. 2 shows the mixing apparatus 2 of FIG. 1 in greater detail. A premixing tank 21 is disposed with its water inlet port 21a below the water outlet port 6a of the condenser 6. A water valve V6 in the conduit 22 joining the ports 21a and 6a controls the flow of water from the condenser 6 to the mixing tank 21. The tank 21 also receives water miscible hydrocarbon fuel via a fuel inlet port 21b which is fed fuel from supply 7 through pump FP2 and conduit 23.

A holding tank 24 is situated below the outlet port 21c of the mixing tank 21. Tank 24 receives the hydrocarbon fuel-water mixture developed in tank 21 through an inlet port 24a in its upper or mixing section 24'. This mixture is delivered via a conduit 25 joining the ports 21c and 24a. The conduit 25 includes a valve V5 which controls the passage of the mixture between the tanks.

A pump FP1 in a conduit 26 conveys the mixture in the holding tank 24 from the tank outlet port 24b to the reformer 2. Downstream from the pump FP1 in the conduit 26, a pressure regulator 27 couples a portion of the mixture in line 26 back to the mixing section 24' of the tank 24 via conduit 28 and tank inlet port 24a.

The tanks 21 and 24 are further provided with switches which control, through a controller 29, the opening and closing of the valves V5 and V6 and the operation of the pump FP2 so as to provide a thorough mixing of volumetrically accurate proportions of the water and water miscible hydrocarbon fuel. More particularly, the mixing tank 21 includes first, second and third switches M1, M2 and M3 which correspond to first, second and third predetermined levels of constituents in the tank 21. The holding tank 24, in turn, includes a first switch F3 which corresponds to a first predetermined position of the fuel-water mixture in holding tank 24.

The control provided by the switches M1–M3 and F3 and the controller 29 is such that fuel is first exclusively delivered to the mixing tank 21 to raise the tank to the second predetermined level. At this time fuel delivery ceases and water is exclusively delivered to raise the tank level to the third predetermined level. At this point, water delivery then ceases. By this action, accurately determined volumes of water and fuel are, therefore, mixed in the tank.

With the level in the mixing tank at the third predetermined level, the tank is ready to deliver the fuel-water mixture to the holding tank. This occurs only when the level in the holding tank falls below the first predetermined position. At this point, the holding tank can accommodate all the mixture in the mixing tank and it is delivered to the holding tank. When delivery to the holding tank results in the level in the mixing tank falling below the first predetermined level, delivery ceases.

The falling of the level in the mixing tank below the first predetermined level also again initiates delivery of fuel to the mixing tank. The above cycle of delivering water and conveying the fuel-water mixture to the holding tank is then repeated.

In order to accommodate the above-described operation, the controller 29 changes the status of the valves V5 and V6 and pump FP2 only upon the switches M1–M3 and F3 taking on predetermined status conditions. More particularly, when the switch M1 takes on a status of closed indicating the level in the mixing tank is below the first predetermined position, the controller 29 closes valve V5 and turns on pump FP2. This causes fuel to be delivered to the mixing tank 21 and prevents transfer of the mixing tank contents to the holding tank 24. When the level in the tank 21 reaches the second predetermined level, the status of the switch M2 changes to closed. This change in status is recognized by the controller 29 which acts thereon to shut off pump FP2 and open valve V6.

Fuel delivery then ceases and water delivery then begins. When the delivery of water raises the level in tank 21 to the third predetermined level the status of switch M3 is changed to closed. The controller 29 recognizes this change in status and closes valve V6, stopping the delivery of water.

With the status of switch M3 closed, a change in the status of F3 to closed indicating the level in tank 24 is below the first predetermined position is recognized by controller 29 as requiring opening of valve V5. This causes the mixture in tank 21 to be delivered to tank 24. This delivery continues until the level in tank 21 falls below the first predetermined level, at which time switch M1 again becomes closed. Controller 29 in response thereto closes valve V5 and turns on pump FP2 to again begin delivery of fuel to tank 21 whereupon the cycle is repeated.

The above operation of the valves V5 and V6 and pump FP2 is summarized in the charts of FIG. 3. These charts show the status of each switch for which the controller 29 takes action. They also show the normal positions of the valves and pump (corresponding to power off) and the status of the switches associated with the power on and power off conditions of these components.

It can be appreciated that the mixing apparatus of FIG. 2 is a gravity type system in that delivery of the water from condenser 6 to the tank 21 occurs by gravity. This is advantageous, since it permits draining of the condenser 6 via a valve V7 situated below the valve V6 during system shut down. Such draining prevents freezing of the water when the fuel cell system is subjected to freezing conditions. The manner of mixing of the fuel and water in the tank 21 also prevents freezing, since water is added only after fuel, such as methanol, having a lower freezing point than water is present in the tank.

The mixing of the water and fuel in the tank 21 is further facilitated by causing the valve V6 to open only so much as to allow the water to drip into the fuel in the tank 21. The water and fuel are therefore thoroughly mixed. Further mixing also occurs by recirculation of a portion of the mixture being pumped from the tank 24 via regulator 27 and conduit 28.

The apparatus of the invention thus provides a thorough and complete mixing of accurate proportions of the fuel and water. It also provides mixing in a manner which inhibits freezing. The fuel-water mixture delivered to the reformer 3 is thus able to be reformed to its maximum extent, thereby promoting efficient operation of the entire fuel cell system 1.

It should be noted that the valves V5, V6 and V7 of the mixing apparatus can be conventional solenoid activated valves. The controller 29, in turn, can be a conventional switch operated relay controller or a conventional microprocessor.

In all cases it is understood that the above-described arrangements are merely illustrative of the many possible specific embodiments which represent applications of the present invention. Numerous and varied other arrangements can be readily devised without departing from the spirit and scope of the invention. Thus, for example, the water supplied to the apparatus 2 can be recovered from the cathode exhaust directly or directly from a gas developed by burning the anode exhaust with air or from a combination of these gases. Alternatively, the water can be derived from a separate water supply.

What is claimed is:

1. A fuel cell system comprising:
   a fuel cell including an anode for receiving fuel gas and a cathode for receiving oxidant gas;
   a reformer for receiving a mixture of water and water miscible hydrocarbon fuel for producing said fuel gas from said mixture;
   a holding tank for holding a supply of said mixture, said holding tank having an inlet section and an outlet;
   first means coupled to said outlet for delivering said mixture from said holding tank to said reformer;
   a mixing tank for receiving a water miscible hydrocarbon fuel from a water miscible hydrocarbon fuel supply and for receiving water from a water supply in predetermined volumetric amounts to produce said mixture;
   and second means for conveying said mixture in said mixing tank to said inlet section of said holding tank.

2. A fuel cell system in accordance with claim 1, further comprising:
   third means for conveying a portion of said mixture being delivered by said first means to said inlet section of said holding tank.

3. A fuel cell system further comprising:
   third means for conveying fuel from said fuel supply to said mixing tank;
   fourth means for conveying water from said water supply to said mixing tank;
   and fifth means for controlling said second, third and fourth means such that: when the level of constituents in said mixing tank falls below a first predetermined level, mixture is inhibited from being conveyed to said holding tank and fuel exclusively is conveyed to said mixing tank; when the level in said mixing tank is raised to a second predetermined level, fuel ceases to be delivered to said mixing tank and water is exclusively delivered to said mixing tank; when the level in said mixing tank is raised to a third predetermined level, delivery of water to said mixing tank ceases; and after said mixing tank is at said third level, when the level of mixture in said holding tank falls below a first predetermined position, mixture is allowed to be conveyed to said holding tank from said mixing tank.

4. A fuel cell system in accordance with claim 1 wherein:
   said control means includes: first, second and third switches arranged at said first, second and third predetermined levels in said mixing tank and a fourth switch arranged at said first predetermined position in said holding tank;
   said second means includes a valve responsive to said control means;
   said third means comprises a pump responsive to said control means;
   and said fourth means comprises a valve responsive to said control means.

5. A fuel cell system in accordance with claim 4 wherein:
   said mixing tank is disposed below said water supply so that water is gravity fed to said mixing tank by said fourth means.

6. A fuel cell system in accordance with claim 5 wherein:
   said valve of said fourth means when opened causes water to drip into said mixing tank.

7. A fuel cell system in accordance with claim 6 wherein:
   said fourth means includes a further valve downstream of said valve of said fourth means for draining the water from said supply.

8. A fuel cell system in accordance with claim 1 wherein:
   said water supply includes a condenser for condensing water contained in gases of said system.

9. A method of operating a fuel cell system having a fuel cell and a former for generating fuel process gas from a hydrocarbon fuel-water mixture comprising:
   delivering exclusively water miscible hydrocarbon fuel to a mixing tank when the level of constituents in said mixing tank falls below a first predetermined level;
   ceasing delivery of said hydrocarbon fuel and initiating delivery exclusively of water to said mixing tank when the level of constituents in said mixing tank reaches a second predetermined level;
   ceasing delivery of said water to said mixing tank when the level of constituents in said mixing tank reaches a third predetermined level;
   subsequent to the level of constituents in said mixing tank reaching said third predetermined level, delivering the hydrocarbon fuel-water mixture to a holding tank when the hydrocarbon fuel-water mixture in the holding tank falls below a first predetermined position;
   and ceasing delivery of said hydrocarbon fuelwater mixture when said level of constituents in said mixing tank falls below said first predetermined level.

10. A method in accordance with claim 9 further comprising:
    extracting the hydrocarbon fuel-water mixture from said holding tank;
    and delivering a portion of said extracted mixture to said reformer and a portion back to said holding tank.

11. A method in accordance with claim 9 further comprising:
    developing the water for delivery to said mixing tank by condensing water from gases in said fuel cell system.

12. A method in accordance with claim 9 wherein:
    delivery of said water is by gravity.

13. A method in accordance with claim 12 wherein:
    delivery of said water occurs by dripping said water into said mixing tank.

* * * * *

UNITED STATES PATENT AND TRADEMARK OFFICE
CERTIFICATE OF CORRECTION

PATENT NO. : 4,585,708
DATED : April 29, 1986
INVENTOR(S) : Sandors G. Abens, William Keil, Mohammad Farooque It is certified that error appears in the above—identified patent and that said Letters Patent is hereby corrected as shown below:

Column 1, before "BACKGROUND OF THE INVENTION" add the following:

GOVERNMENT INTERESTS

The invention described herein may be manufactured, used and licensed by or for the United States Government for government purposes without the payment of any royalties thereon. The invention herein evolved out of Government Contract Number DAAK 70-79-C-0249 by and between the U.S. Army and Energy Research Corporation.

Signed and Sealed this

Seventh Day of April, 1987

Attest:

DONALD J. QUIGG

Attesting Officer

Commissioner of Patents and Trademarks